March 15, 1932. W. J. LANDER 1,849,937
CONSTRUCTION OF BICYCLES
Filed Jan. 11, 1930

INVENTOR
WALTER J. LANDER,
BY
ATTORNEY

Patented Mar. 15, 1932

1,849,937

UNITED STATES PATENT OFFICE

WALTER JUPE LANDER, OF EXMOUTH, ENGLAND

CONSTRUCTION OF BICYCLES

Application filed January 11, 1930, Serial No. 420,193, and in Great Britain January 16, 1929.

This invention relates to saddles for bicycles and has for its object the provision of an improved construction and arrangement of saddle mounting designed to enable a saddle to be adjusted in height whilst a bicycle is in motion for such a purpose as to enable the rider to stop without dismounting by placing one foot or both feet on the ground, also to facilitate mounting and dismounting.

According to the present invention a bicycle saddle is carried by two slidable pillars which prevent turning of the saddle during adjustment these pillars being slidable with respect to framework members in or upon which they are adapted to be secured in any of a number of pre-determined positions by manually operable retaining devices.

According to the preferred form of the invention the lower portion of one of the saddle pillars is serrated, perforated or otherwise formed to be engaged by a detent or detents carried by the stationary frame member within which is slidable a second pillar being slidable in a second stationary frame member within which is disposed a resilient device for urging the saddle in an upward direction.

Reference will now be made to the accompanying drawings which illustrate by way of example a construction according to the invention and in which:—

Figure 1:
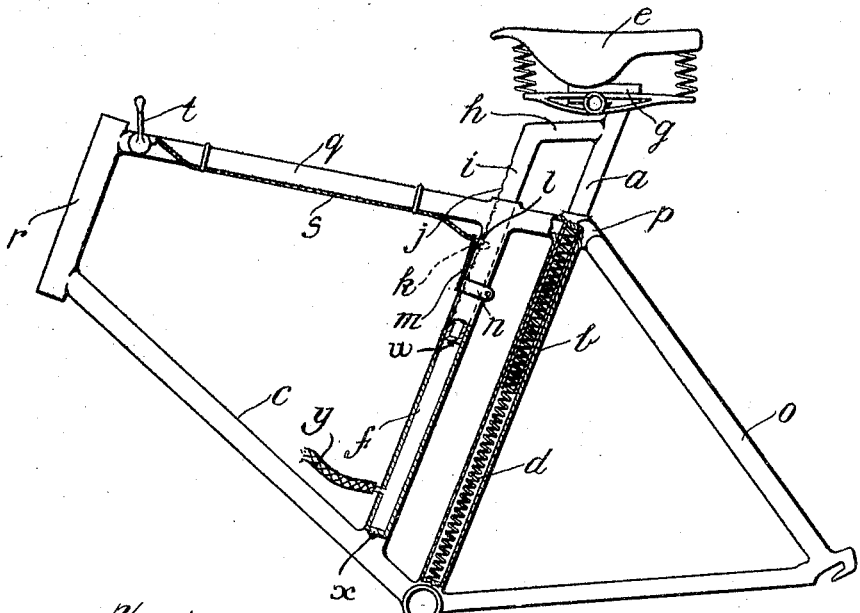
Figures 2, 3:
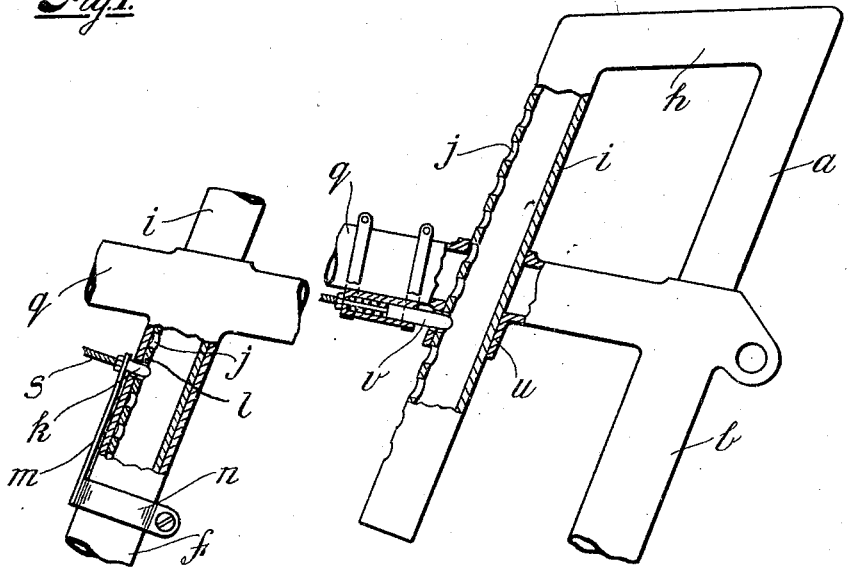

Figure 1 is an elevation of part of a bicycle frame with the invention applied thereto, Figure 2 is a detail on an enlarged scale of the means for retaining the saddle pillar in any position of adjustment and Figure 3 is a view of a modified form of construction.

In the form illustrated in Fig. 1 the saddle pillar $a$ of a bicycle is slidably mounted within the rear frame member $b$ of a frame $c$ of which ordinarily the saddle pillar $a$ forms a fixed part. Beneath the lower end of the saddle pillar $a$ is disposed a coiled spring $d$ to cushion its movements and having sufficient strength to raise the saddle when the pillar $a$ is disengaged as hereinafter described.

In order to prevent turning of the saddle $e$ and pillar $a$ a second frame member $f$ is added to the bicycle framework $c$ slightly in advance of and parallel to the frame member $b$ which ordinarily carries the saddle pillar. The horizontal bracket $g$ which carries the saddle may have a downward extension or a second bracket $h$ as shown may be provided carrying a downward extension member $i$ which telescopes into the additional frame member $f$ and acts as a guide to prevent the saddle and its supporting pillar $a$ from pivoting in the frame member $b$ during periods of adjustment.

The lower portion of the additional saddle pillar $i$ is provided with a series of perforations $j$ any one of which is adapted to be engaged by a locking member $k$ which projects through a slot $l$ in the tubular frame member $f$ and is mounted on the free end of a leaf spring $m$ secured to a clamp $n$ fixed around the member $f$.

To accommodate the above described arrangement in a bicycle frame construction it is necessary to connect the rear fork $o$ to the rear frame member $b$ at a point $p$ which is lower than the usual position but above the locking device $k$ and the junction $p$ of the rear fork $o$ with the rear frame member $b$ may be connected by a short tubular element with the additional frame member $f$ or in a man's bicycle may be connected directly by a frame member $q$ with the steering pillar $r$ thus eliminating the usual upper horizontal frame member. The locking member $k$ is connected by a Bowden wire $s$ with a hand operating device $t$.

With the arrangement above described the rider by operating the member $t$ can release the locking device $k$ and by exerting a downward pressure on the saddle $e$ can lower it to any desired position and then release the handle $t$ to allow the locking device $k$ to retain the saddle in that position. If on the other hand pressure on the saddle $e$ is relaxed when the locking member $k$ is rendered temporarily inoperative the spring $d$ will lift the saddle up to any limit permitted by the rider and the locking member $k$ is again released to lock the saddle in such position.

If desired the additional tubular frame member $f$ may constitute the barrel or cylinder of a pump for inflating the tyres of the bicycle. For this purpose the lower end of the additional saddle pillar $i$ may be provided with a cup leather $w$ and the frame member $f$ provided with a partition $x$ immediately below the lowest point of travel of the pillar $i$ the frame member $f$ having an outlet connected by a tube with a flexible tube $y$ passing out through the lower end of the frame member $f$ and capable of connection to the front or rear wheel, such tube being adapted when not in use to be clamped to the frame $c$. With this arrangement and when the bicycle is stationary the locking device is rendered temporarily inoperative and the saddle reciprocated for the purpose of operating the pump and inflating the tyres.

In the modified construction illustrated in Fig. 3 the additional frame member $f$ is not employed, the additional saddle pillar $i$ passing through a socket $u$ which acts as a guide. In this construction the saddle is adapted to be mounted directly on the member $h$. The pillar $i$ is perforated as before and is engaged in various positions by a spring pressed bolt $v$ under the control of a Bowden wire.

The invention possesses the advantage that the position of the saddle can be adjusted by the rider whilst in motion whilst a bicycle constructed according to the invention can be adjusted for such purposes as riding through traffic the rider lowering the saddle so that the feet are within easy reach of the ground.

It is to be understood that various modifications may be made without departing from the invention. For example, instead of perforating the saddle support $i$ this may be provided with other means to engage the locking element whilst the locking element may also be of any suitable form other than that illustrated in the drawings.

I claim:—

1. Means for adjusting the position of a bicycle saddle comprising a pair of pillars connected to one another for carrying said saddle, pair of hollow members constituting part of the frame of the bicycle, said pillars being arranged slidably in said hollow members, resilient means in one of the said members coacting with the corresponding pillar normally to urge it upwardly and means cooperating with the second hollow member to lock the other pillar in its adjusted position.

2. Means for adjusting the position of a bicycle saddle comprising a pair of parallel pillars integrally connected to one another for carrying said saddle, a pair of hollow members constituting part of the frame of the bicycle, said pillars being arranged slidably in said hollow members, a spring in one of the said members coacting with the corresponding pillar normally to urge it upwardly whereby the pillars and the saddle carried thereby are capable of adjustment while the bicycle is in motion, and means for locking the parts in their adjusted positions.

3. Means for adjusting the position of a bicycle saddle comprising a pair of pillars which are connected to one another, carrying the saddle, a bicycle frome having sockets wherein the said pillars are slidably arranged, a spring normally urging said pillars upward, and means whereby the positions of the pillars may be adjusted, to correspondingly adjust the height of the saddle while the bicycle is in motion.

4. Means for adjusting the position of a bicycle saddle according to claim 3 wherein a resiliently mounted locking member under the control of the rider is provided, one of the pillars having a series of apertures therein, and the corresponding socket having an opening adapted to cooperate with any one of said series, the locking member being adapted to pass through said opening and any one of the series of apertures.

5. Means for adjusting the position of the saddle of a bicycle while the latter is in motion comprising a pair of pillars integral with each other and supporting the saddle, a pair of tubular members constituting a part of the frame of the bicycle, said pillars being slidably mounted in said tubular members, a spring disposed in one of said members and acting on the corresponding pillar to urge it upward, a resiliently mounted locking member arranged on the second tubular member, said tubular member having a slot therein through which said locking member passes, the pillar mounted in said tubular member having a series of slots therein any one of which may be alined with the slot of the tubular member and engaged by the locking member, and means operable by the rider of the bicycle, to withdraw the locking member against the effort of its resilient means, to permit the position of the pillar to be adjusted.

In testimony whereof I have hereunto set my hand.

WALTER JUPE LANDER.